Aug. 4, 1953 W. B. DEAN ET AL 2,647,415
VEHICLE TRAVEL CONTROL MEANS
Filed April 5, 1950 5 Sheets-Sheet 3
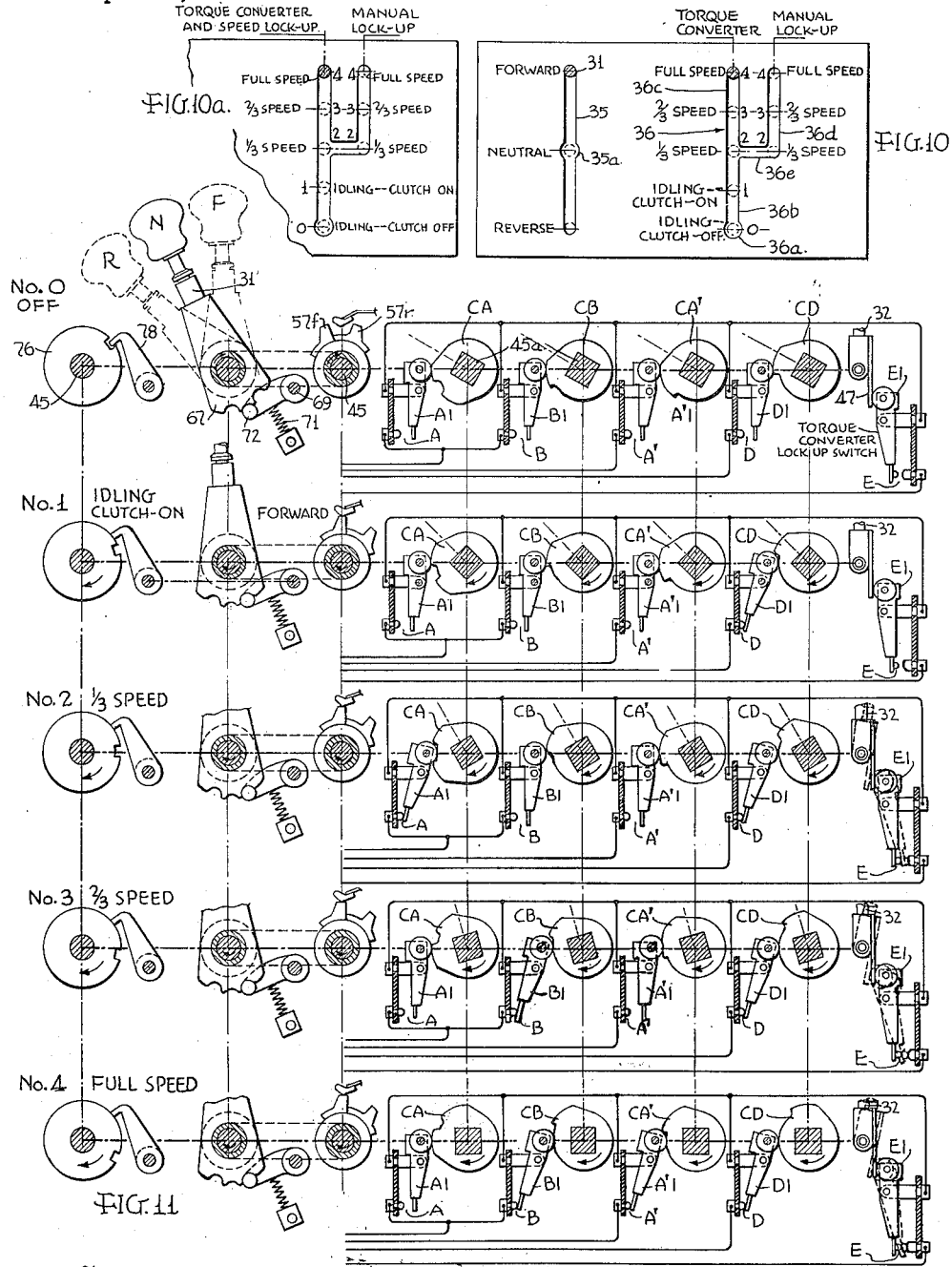
INVENTORS.
Walter B. Dean
David L. Buchanan
BY
Maurice A. Crews
ATTORNEY

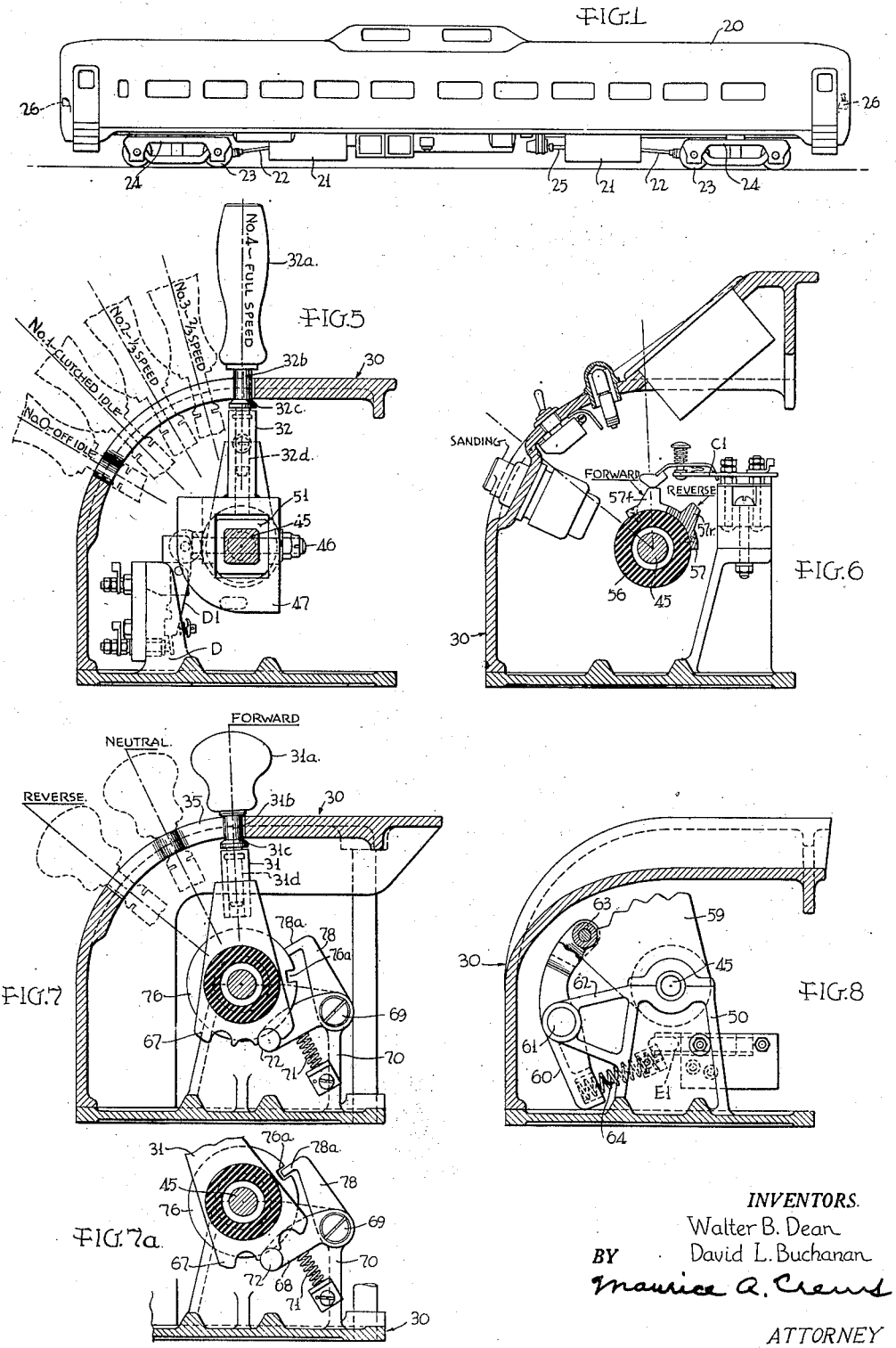

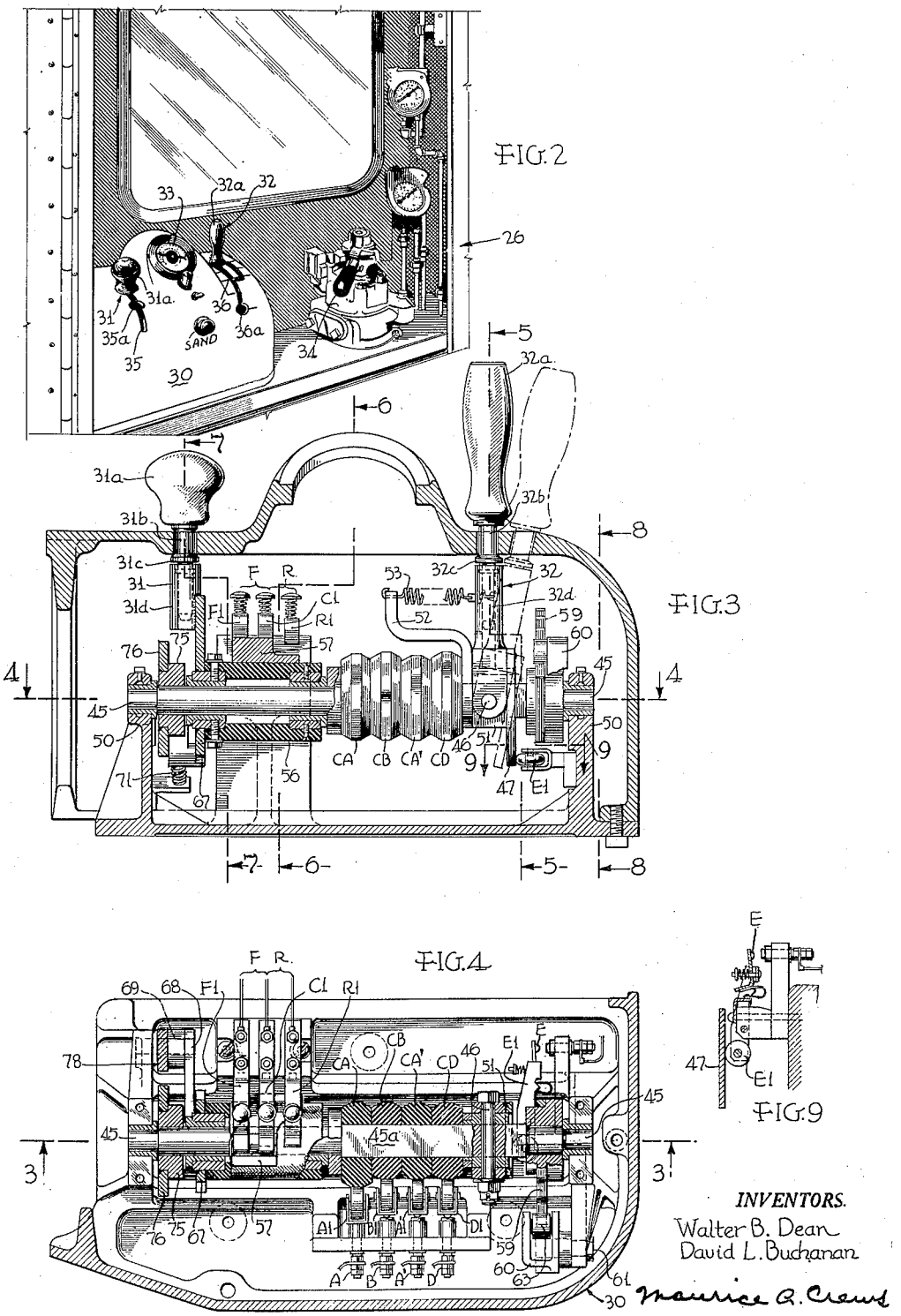

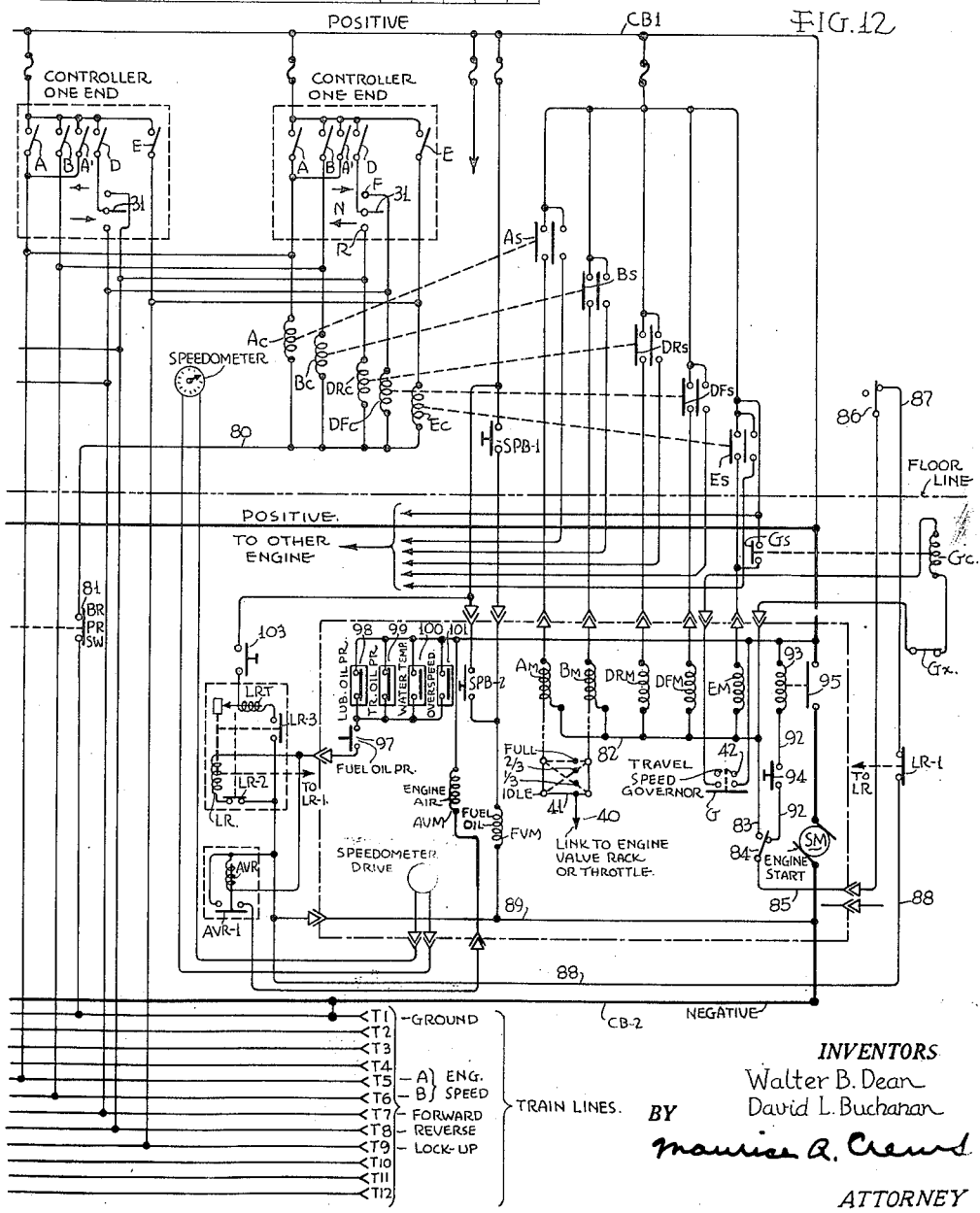

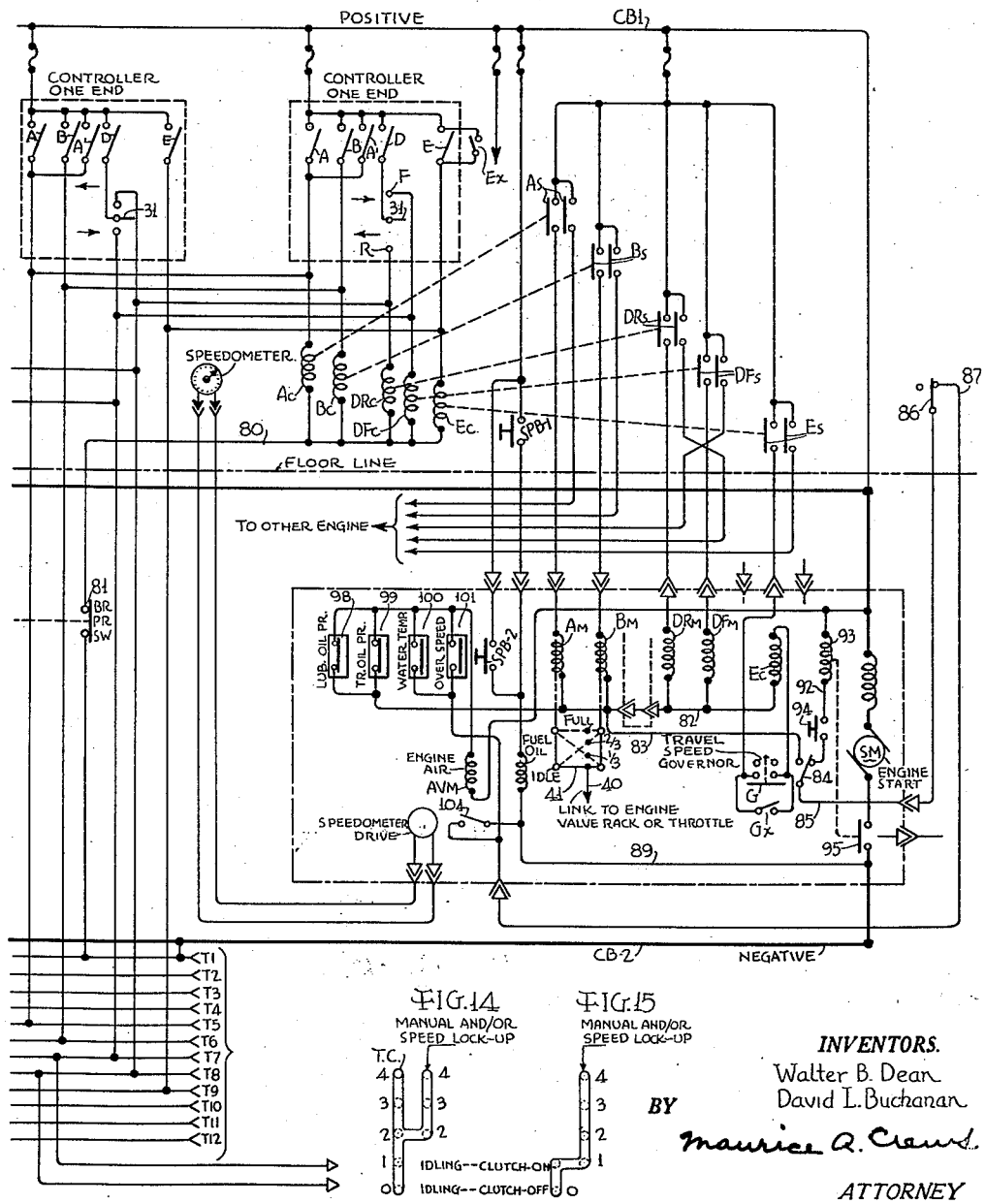

Patented Aug. 4, 1953

2,647,415

UNITED STATES PATENT OFFICE 2,647,415

VEHICLE TRAVEL CONTROL MEANS

Walter B. Dean, Paris, France, and David L. Buchanan, Whitemarsh, Pa., assignors to The Budd Company, Philadelphia, Pa., a corporation of Pennsylvania Application April 5, 1950, Serial No. 154,154

10 Claims. (Cl. 74—645)

This invention relates to vehicle travel control means, especially to means for controlling a power drive installation which includes an internal combustion engine and a torque converter unit, and has for an object the provision of improvements in this art.

The invention has been developed in connection with self-propelled rail cars and will be described with particular reference to such use but it will be understood that the invention is applicable to other types of vehicles. It has particular application to the use of a diesel engine as the prime mover.

The various attempts to apply diesel engines as prime movers for large land vehicles are well known. Some have been sufficiently successful to have very extensive use as locomotive units where size and weight are not too restrictive but nevertheless they all have basic faults and improvements have constantly been sought to adapt them for use in smaller units.

Studies in diesel engine drives start with the well-known fact that this type of engine operates best in a relatively narrow speed range compared to ordinary small internal combustion engines. Consequently, direct gear drives of heavy vehicles, for which diesel engines are best suited, are heavy, and difficult and slow to shift mechanically. Clutches for shifting engagement of these high torques present difficult heat dissipation problems.

Generator-motor drives eliminate heavy gears and are widely used for locomotive units but the separate generator and motor units which are required are still very bulky, heavy and costly and, moreover, these installations impose electrical losses in both the generators and motors.

Torque converter drives have been used, and while these are very satisfactory for starting and low speed drives, they involve too much power loss at high speeds to be fully desirable. The installation with which the present invention is associated consists of a diesel engine as the prime mover, a torque converter of several stages, and a lock-up clutch for direct drive to eliminate the torque converter action above certain minimum speeds. Connected to the torque converter is a reverse gear mechanism with constantly meshed gears. In this installation there are two clutches, one for forward and one for reverse drive. When one clutch is engaged, movement in the forward direction results; when the other is engaged, reverse movement results; and when both are disengaged the engine will idle under no load.

It is the problem of the control mechanism to best utilize these features for proper operation of the car. The present control system allows the selection of four variations or combinations of the elements of the basic system, as follows:

1. Torque converter alone can be used as has been done in the past.
2. Torque converter can be used with manual choice as to the use of lock-up in direct drive.
3. Torque converter with manual choice of lock-up but protected by a speed governor may be used to prevent misuse by engaging the lock-up at too slow a speed.
4. Torque converter with automatic lock-up may be used with a required intermediate hesitation to facilitate proper use of the mechanism and to provide proper sequence of clutch engagement.

A reverse lever determines which clutch will engage when an engine fuel throttle or torque control lever is moved from a No. 0 or "off" to a No. 1 position. In this specific installation the engine is governed to 800 R. P. M. in both the "off" and No. 1 positions. Although the engine will run at lower speed, this speed is desirable to maintain auxiliary power drive speeds. In "off" the car will coast with no engine drag, when desired. In No. 1 position slow movement, such as in switching, may be effected. In No. 2 position of the engine throttle lever low speed operation is afforded or high speed down hill operation may be maintained. In a No. 3 position of the throttle lever high speed cruising operation is involved. In a No. 4 position maximum speed on level or on grades results, this position also being used for maximum acceleration.

Certain losses in efficiency are inherent with torque converter drives. It is therefore desirable to use direct drive at high cruising speeds, particularly where stops are relatively infrequent. Due to the inherent slip of the torque converter very fine control of speed is available by allowing the shift from torque converter to direct drive at the same throttle position. In those cases where this is not necessary the simpler arrangement is to allow automatic lock-up when the most economical speed is reached. In cases where manual lock-up is desirable this may be protected by the automatic lock-up which will prevent engagement of the lock-up clutch at too slow a travel speed. To aid in determining proper speed for manual engagement of lock-up the speedometer dial is marked, as in a distinctive color contrasting with adjacent dial areas, to show this desirable direct drive travel speed range.

When coasting at high speeds with the throttle control in the "off" position it is desirable when shifting to a driving connection that the reverse gear clutch engage before the lock-up clutch engages. In order to assure this an off-set in the lock-up drive portion of the clutch is provided, causing a hesitation between those positions engaging the reverse gear clutch and those allowing engagement of the lock-up clutch.

It is, therefore, one object of the present invention to assure engagement of the main drive clutch before the direct-drive means can be engaged and to maintain the engagement of the main drive clutch for short stops, holding the vehicle by the brakes against low fluid torque, in order to achieve a quick and smooth start after the stop.

Another object is to provide means for closer synchronization of engine and ground travel speeds when making the shift from torque converter to mechanical drive.

Another object is to provide means for changing the shift control from selective supervision to governor supervision if operating conditions are suitable.

Another object is to provide suitable control interlocks to assure that the engine is idling at lowest speed when the shift to any driving position (forward or reverse) is made.

Another object is to provide an improved drive shift control mechanism.

The above and other objects and features of the invention will be apparent from the following description of an illustrative embodiment, reference being made to the accompanying drawings thereof, wherein:

Fig. 1 is a side elevation of a rail car embodying the invention, the view showing the locations of the drive-control units;

Fig. 2 is a perspective view of the controls;

Fig. 3 is a vertical axial section through the drive control unit;

Fig. 4 is a horizontal section taken on the line 4—4 of Fig. 3;

Fig. 5 is a vertical transverse section taken on the line 5—5 of Fig. 3;

Fig. 6 is a vertical transverse section taken on the line 6—6 of Fig. 3;

Fig. 7 is a vertical transverse section taken on the line 7—7 of Fig. 3;

Fig. 7a is a view like Fig. 7 but showing the parts in a different position;

Fig. 8 is a vertical transverse section taken on the line 8—8 of Fig. 3;

Fig. 9 is a partial horizontal section taken on the line 9—9 of Fig. 3;

Fig. 10 is a plan view, flattened, of the control box cover, showing the control lever slots;

Fig. 10a is a view like part of Fig. 10 to show a different operational arrangement with the same apparatus;

Fig. 11 is a diagrammatic view to show the various stages of cam operation of the control switches;

Fig. 12 is a wiring diagram showing the interrelationship of parts as controlled according to the arrangement of Figs. 10 or 10a;

Fig. 13 is a slightly modified wiring diagram which may be associated with the same apparatus;

Fig. 14 is a control slot diagram similar to Figs. 10 and 10a, showing the functions and designations for the wiring system of Fig. 13;

Fig. 15 is a modified control slot diagram which is adapted to be used with the system of Fig. 13; and Fig. 16 is a schematic view of the power and driving means.

The invention is applicable to land vehicles and in Fig. 1 is illustrated as being applied to self-propelled rail car 20 which may be operated in either direction, either alone or as one of a number of cars in a multiple-unit train.

As illustrated, there is an engine-transmission unit 21 mounted under the car on one or both sides of the center, each being arranged to drive a shaft 22 connected with an axle of wheels 23 of a truck 24. Another shaft 25 drives a generator, and also other devices, if desired.

As shown in Fig. 16, the engine 21a has a drive shaft 21b which drives a torque converter part 21c. Through the fluid this drives a torque converter part 21d, here illustrated as a casing for the fluid and the part 21c. No attempt is made to show the actual torque converter details, this view being a general diagram and both the engine and torque converter units being taken as known market items from other suppliers. A direct drive lock-up clutch 21e is splined on the engine shaft 21b so it may connect the shaft directly with the casing part 21d and cut out the fluid drive action. Suitable gearing and a forward clutch 21f and a reverse clutch 21g complete this general diagram assembly.

At one or both ends the car is provided with controls generally indicated by the numeral 26. In Fig. 2 the controls are seen from the vicinity of the operator's position in the front vestibule of the car.

At the left in Fig. 2 there is a control box 30 presenting a reverse lever 31 and a clutch and power or throttle control lever 32. A speedometer 33 is carried on the same control box, this having a contrasting critical zone indication, as mentioned above. At the right of the control box there appears a brake control lever 34 and certain indicators and piping common to rail car operation.

As shown in Figs. 2 and 10, the reverse lever 31 operates in a slot 35 having an enlarged portion 35a at the "neutral" position which permits the handle 31a to be removed. As shown in Fig. 3, the handle 31a has a stem or shank 31b which carries a flange 31c which underlies the slot and prevents removal of the handle except at the enlarged portion 35a. Therebelow the handle stem is reduced, as at 31d, to fit in a socket of the lever 31.

Likewise the power or throttle control lever 32 operates in a slot 36 having an enlargement 36a in the "off" position where the engine is de-clutched and idling. In Fig. 3 the lever 32 is shown to have a handle 32a with a stem or shank 32b with a collar 32c and a reduced stem portion 32d for the same purposes as like parts on the lever 31. In addition to the trunk portion 36b above the enlargement 36a (Fig. 10), the slot 36 has a branch portion 36c, a second branch portion 36d and a transverse cross-over portion 36e, for a purpose to be described hereinafter. The slot thus takes the general form of a square Y and may be referred to as a Y-slot.

The brake control lever 34 may, in known manner, have a spaced lower finger which underlies an arcuate flange with a slot to prevent removal except in an inactive position.

It will be well to observe here that there is supplied an operating magnet for each clutch mechanism. These may be sufficiently well understood by reference which will hereinafter be made to the magnet power control coils. Likewise the fuel supply or throttle valves are of a known rotary type controlled by a common throttle valve rack bar for different engine torque output stages. The wiring diagrams show power magnets or solenoids for controlling this valve adjusting rack. The mechanism between the magnets and the rack bar comprises a lever with unequal arms on each side of the rack bar, to each of which arms a magnet armature rod is attached. This "grasshopper" linkage is clearly shown in principle in the wiring diagrams.

In these diagrams, Figs. 12 and 13, the switches which initiate the control are located in the control box and are designated A, rack, short pull or ⅓ throttle; B, rack, long pull or ⅔ throttle; A', auxiliary to and same function as A; D, main clutch engaging, in conjunction with F, forward, and R, reverse; and E, lock-up past torque-converter for direct drive.

The respective relay coils and their switches are located in a cabinet in the car, the coils being designated respectively $Ac$, $Bc$, $DFc$, $DRc$, and $Ec$ and their switches being designated respectively $As$, $Bs$, $DFs$, $DRs$, and $Es$.

The power magnet coils which these relays control are located near or on the engine assembly and are designated respectively $Am$, $Bm$, $DFm$, $DRm$ and $Em$.

The rack operating link 40 is seen to be connected nearer to one end of the grasshopper link 41 than the other so that magnet $Am$, operating first, pulls the long end of the lever to give ⅓ throttle; magnet $Bm$, operating next, pulls the short end of the lever to give ⅔ throttle; and $Am$ and $Bm$, operating last together, pull both ends of the lever to give full throttle. These successive positions are shown in Fig. 12 by several lines and designated respectively as "idle," "⅓," "⅔," and "full."

In addition there is a speed governor 42 provided with a switch G which closes at a predetermined travel speed. When the switch G closes it energizes a relay coil $Gc$ and closes a relay switch $Gs$.

The governor and its relay switch may function in various ways by change of connections. In Fig. 12 they are shown to be arranged with the switch $Gs$ in parallel with the manually controlled switch $Es$ so that the closure of either will cause lock-up in direct drive. A switch $Gx$ is provided which by being opened will eliminate the control function of the governor.

In Fig. 13 the switch G is shown to be placed in series with the switch $Es$, the governor control being cut out when desired by switch $Gx$ and the action of switch E being cut out when desired by a switch $Ex$.

The basic control operations may be understood from the description of apparatus up to this point. The details of the apparatus for assuring this operation will be described later.

Assuming that the speed control lever 32 is in the "off" position, with the engine idling and declutched, the reverse lever 31 can be moved out of "neutral" position. Assume (Fig. 10) that it is moved to the "forward" position. Its stem is shown in full lines in the "forward" position in Fig. 10. This closes the line from switch D to switch contact F in Fig. 12. The chart at the top of Fig. 12 shows the switch operation, the left portion of the chart showing the switches operated by the throttle lever 32 and the right portion showing the switches operated by the reverse lever 31. The arrows from the right portion to the "off-idle" line of the left portion indicate that the lever 31 can only be operated when the lever 32 is in the "off" position. It is also arranged, and the arrows may be taken to indicate, that the lever 32 cannot be moved from its "off" position unless the reverse lever 31 is positioned away from "neutral" position, i. e., either in "forward" or "reverse" position.

With the reverse lever in "forward," as stated, the throttle control lever 32 is moved to the next or No. 1 position designated in Fig. 10 as "idling-clutch-on." The left portion of the Fig. 12 chart shows that this closes switch D. The diagram of Fig. 12 shows that this energizes relay coil $DFc$ which closes its switch $DFs$ which energizes magnet coil $DFm$ and causes the main clutch to be engaged. This connects the torque converter output shaft with the wheels. Some driving drag is exerted on the wheels but it is small and the wheels are held by the brakes until the train is ready to start. The brakes are then released and the train begins to move if the force is sufficient.

It will next be assumed for a first operating situation or arrangement that governor cut-out switch $Gx$ is open to render the car speed governor completely ineffective, leaving operations entirely under manual control. This is delineated from the speed control lever in Fig. 10.

When the throttle lever 32 is moved up the left side of the Y-slot it closes in order, switch A in the No. 2 or ⅓ throttle position, switch B in the No. 3 or ⅔ throttle position, and switches B and A' in the No. 4 or full throttle position. Switch D will be kept closed for all of the positions from No. 1 up. Closure of A will energize $Ac$ to close $As$ to energize $Am$ to pull up the long arm of lever 41 to give the ⅓ throttle position of rack link 40. Closure of B will energize $Bc$ to close $Bs$ to energize $Bm$ to pull up the short arm of lever 41 and, switch A being open at this time, give ⅔ throttle position of rack link 40. Closure of A' and B will energize $Ac$ and $Bc$ to close $As$ and $Bs$ to energize $Am$ and $Bm$ to pull up both ends of lever 41 to give the full throttle position of rack link 40.

The engine thus reaches full torque output in torque converter drive. To reach direct drive it is now required that the lever be brought back down to the No. 2 position to reduce the engine torque output and speed. In this position the lever 32 may be moved laterally in the crossover portion 36e of the Y-slot.

In moving along the crossover portion 36e of the slot the lever 32 closes switch E. The actual mechanical parts will be described presently but it may be noted by reference to Figs. 3 and 4 that the lever 32 is not only mounted to turn about the axis of a shaft 45 but is also mounted to turn about an axis, as of a pin 46, which is transverse to the axis of the shaft 45. The lever 32 carries a plate 47 which, when the lever is moved to the right, moves away from the operating lever E1 of switch E and allows the switch contacts to close, as shown in Fig. 9. Closure of switch E, Figs. 10 and 12, energizes relay coil $Ec$ to close its switch $Es$ and energize magnet coil $Em$, which causes lock-up in direct drive.

Thereafter, still following Fig. 10, as the lever 32 is moved up in the right branch 36d of the Y-slot, it will in succession close switches A, then B, and then both B and A' together to give higher engine torque, as described before for the left branch 36c of the slot.

As another condition for operation according to Fig. 12, switch $Gx$ is closed to make the car speed governor effective. In this case, Fig. 10a, when the lever 32 is moved up the left branch 36c of the slot, as before described, the switch E is open as before and consequently its relay switch Es is open; but the governor relay switch Gs is in parallel with switch Es and will close at the speed at which the governor is set to close its switch G to energize its relay Gc. This energizes magnet Em and causes lock-up in direct drive the same as if switch Es had been closed. If now it is desired to operate in direct lock-up drive without dependence on the governor the lever 32 is brought back to the No. 2 or ⅓ throttle position and is moved along the crossover slot portion 36e to close switch E, as described above. The operating control with the switch Gx closed and the governor switch cut into the control circuit is shown in Fig. 10a.

Fig. 13 shows a wiring diagram in which the governor switch G is arranged in series with switch E to require both switches to be closed to lock-up in direct drive. This means that the lever 32 must be moved along the cross-over portion 36e of the slot to close switch E and that the governor can then cause lock-up in direct drive as the lever is moved up the right branch 36d of the Y-slot and the engine comes up to the predetermined speed for governor lock-up. The left branch 36c is now devoted wholly to torque-converter drive. This is represented by Fig. 14 and the chart at the top of Fig. 13.

Thus lock-up may be obtained either (1) by the throttle lever, providing the car speed governor is closed, or (2) by car speed governor, providing the throttle lever is in lock-up position.

If desired, the action of the governor may be cut out by closing switch Gx, leaving the lock-up entirely to manual control. This is again the situation represented by Fig. 10.

It may be desirable to dispense entirely with high speed torque drive in torque-converter and lock up in direct drive whenever the travel speed is sufficient. The manual switch E (Fig. 13) may be retained or its action may be entirely nullified, as by closing the parallel switch Ex. Fig. 15 shows a slot in which the left branch has been omitted and in which the crossover portion 36e' of the slot has been brought down from the No. 2 (½ torque) position to the No. 1 (idling-clutched) position. The trunk portion 36b' is thereby shortened and the right branch 36d' is correspondingly lengthened.

The Y-slot has now become a jogged or offset slot and in operation the effect is to require a stop of the handle as it moves up from the "off" position to the No. 1 position to give the main clutch (forward or reverse) time to be fully engaged before the lever can be moved across and up into higher speed positions which produce direct drive lock-up. There is therefore no chance that the direct drive lock-up clutch mechanism will operate before the main clutch operates to place an undue burden on the main clutch as would be the case if it operated last. Moreover, for some stops the lever may be brought to idling position without disengaging the main clutch, the car being held by the brakes against the slight drag of the torque converter. The car may be quickly re-started from this position without requiring re-engagement of the main clutch.

The main apparatus and its mode of operation have been described. Now the details of the apparatus will be explained.

As shown in Figs. 3 to 10, the shaft 45 is mounted in bearing brackets 50 and the speed control lever 32 is supported by its pin 46 and a sleeve 51 on a non-round or square portion 45a of the shaft. The pin 46 extends through arm, sleeve and shaft, being made as a bolt and having a nut on the end. Also carried on the square part of the shaft are cams CA, CB, CA' and CD for operating the respective levers A1, B1, A'1 and D1 of the switches A, B, A' and D. It may here be explained, as is evident from the wiring diagrams, that switches A and A' control the same relay Ac and this because the cam shape for operating a single switch by a single cam did not serve quite as well as the shapes for two cams for two switches. With other material, that illustrated being non-metallic, a single cam and switch might well be substituted for the two here shown. The sleeve 51 carries an upstanding bracket 52 for the anchorage of a spring 53 which is attached to the control lever 32 to pull it toward the left. That is, the spring 53 tends to keep the lever 32 over on the left side of the Y-slot (or in the left lower trunk portion of the jogged slot of Fig. 15).

Reverse lever 31 is rotatably mounted on shaft 45, here being shown to be rigidly assembled with an insulating sleeve 56 which carries a contact strip 57. Suitably shaped portions 57f and 57r of the strip 57 serve to connect the contact arm C1 of a common conductor respectively with the contact arm F1 for forward clutch engagement and the contact arm R1 for reverse clutch engagement. When the lever is in forward position the common conductor arm C1 and the forward conductor arm F1 engage the portion 57f contact strip and current flows between them; when the lever is in "reverse" position the common conductor arm C1 and the reverse conductor arm R1 engage the portion 57r of the contact strip and current flows between them; and when the lever is in "off" or "neutral" position only arm C1 engages the strip, and no current flows.

The interlocking means between reverse lever 31 and speed control lever 32 is shown at the left of Figs. 3 and 4 and in Figs. 7, 7a and 8. First, in Fig. 8 it may be observed that the shaft 45 which carries the speed control lever 32 also carries a sector 59 having a plurality of notches on its periphery, there being five notches corresponding to the five positions described for the lever, namely, No. 0 or "off," No. 1, No. 2, No. 3 and No. 4. The sector 59 is urged to remain in a selected one of these five given positions by a detent lever 60 pivoted at 61 on a bracket 62 and having its detent roller 63 pressed against the periphery of the sector by a compression spring 64 acting against the other end of the lever.

Next, in Figs. 7 and 7a it may be noted that the assembly of parts connected with the reverse lever 31 includes a sector 67 having a plurality of notches in its periphery, there being three notches corresponding to the three positions described for the lever, namely, "forward," "off" or "neutral," and "reverse." It is to be noted that the "off" or "neutral" notch is of less depth than the other two for "forward" and "reverse." The sector 67 is urged to remain in a selected one of these three given positions by a detent arm 68 carried by a jack shaft 69 mounted on a bracket-like structure 70 at the end of the box 30. A coil compression spring 71 urges the detent pin or roller 72 of the arm 68 against the periphery of the sector 67.

At its left end the shaft 45 has secured thereon a collar 75 which carries rigid therewith a disk 76 having a notch 76a therein. Parts are so arranged on the shaft 45 that the notch 76a corresponds to the "off" position of the speed control lever 32. More specifically, a latch lever 78, which is fast on the jack shaft 69, carries a finger 78a which enters the notch 76a when the speed control lever 32 is in the "off" position.

Now it may be seen from Fig. 7a that when the reverse lever 31 is in the middle or "neutral" position the detent pin 72 rides high in the elevated center notch thereby holding the latch finger 78a in the latch disk notch 76a so that the disk 76, shaft 45 and throttle control lever 32 are all held against movement out of the "off" position. However, the lever 31 can be moved to either "forward" or "reverse" position. Fig. 7 shows it moved to "forward" position. Now detent pin 72 rides in a deep notch in the sector 67 allowing spring 71 to push it up and with it turn jack shaft 69 and latch lever 78 to raise finger 78a out of the notch 76a. The disk 76, shaft 45 and throttle control lever 32 can now be turned and Fig. 7 shows that they have been turned up away from the "off" position. But after the disk 76 has been turned away from the "off" position the finger 78a rides on the arcuate periphery of the disk 76 to hold the detent pin 72 in the deep notch of sector 67 and, as a consequence, the lever 31 cannot be moved again until the lever 32 is brought back into the "off" position.

This specific type of interlock mechanism is known and is not a part of the present invention. Other equivalent interlock mechanisms may be substituted so long as they serve the purpose of the present invention. The functioning of all these control box parts will be evident from Fig. 11, considering the designations thereon, the wiring diagrams, and the description given hereinabove.

Some related apparatus is shown in Fig. 12 and will be described to provide a more complete understanding of the invention.

It may first be noted that a division of duty is made in the electrical system between train line and car battery (or generator) current. Due to the fact that train line current is commonly derived from the control car of a train of cars, it is arranged that only the necessary and smaller units will be supplied with train line current and that the larger units will be supplied with car battery current from that car on which they are located. When a single car is operated alone all units are naturally supplied from one source; but if there are several cars with a plurality of units taking train line current for coordinated control it can be seen that the drain on the battery of a single car would be very heavy if the number and size of units supplied is not kept to a minimum.

There are a number of train line conductors, not all used for the present engine controls, which are designated at the bottom of Fig. 12 as T1, T2, T3, T4, T5, T6, T7, T8, T9, T11, T12. A positive car battery conductor is shown at the top of Fig. 12 and designated as CB1.

The controls for the car are shown in duplicate, one for each end of the car, but only one engine assembly is shown. Switch A (and A') is connected to T5 and CB1; switch B to T6 and CB1; switch D—F to T7 and CB1; switch D—R to T8 and CB1; and switch E to T9 and CB1. The relay coils Ac, Bc, DRc, DFc and Ec are connected through the respective switches A, B, D (F, R), and E between line CB1 and a conductor 80 leading to train line T1. A brake pressure switch 81 is inserted in conductor 80 to open and reduce the engine to idling speed, and to de-clutch it when the brake pressure becomes excessive, as for an emergency application. These brake pressure safety switches are provided on all cars for all engines to return them to de-clutched idling condition when the brake pressure on a car reaches the set limit. The other safety devices to be described operate for one engine only and shut it down completely. Relay switches As, Bs, DRs, DFs, Es and Gs are connected to CB1 and to their respective magnet coils Am, Bm, DRm, DFm and Em. These magnet coils are connected to a common conductor 82 and this conductor is connected through a conductor 83, an isolation switch 84, a conductor 85, a disconnect switch 86, a conductor 87, a safety switch LR–1, conductor 88, and conductor 89 to the negative side CB2 of the car battery circuit.

Isolation switch 84 is located inside the engine casing access door and must be moved in one direction before the engine starting motor SM can be operated and must be moved back before the engine controls can be made effective. The switch is shown on the contact of a conductor 92 leading from the coil 93 of a starting relay which is connected to CB1. When a starting pushbutton 94 is pressed down to connect its contacts in conductor 92 it energizes starting relay coil 93 and closes starting switch 95 to operate the starting motor SM.

The disconnect switch 86 is located in the car locker near the operator's station and is left closed while the car is in operation.

Relay switch LR–1 is operated to open by a latch relay coil LR when energized through certain safety switches. These safety switches include a fuel oil pressure switch 97 which is in series with a number of other switches in parallel. Switch 97 closes and remains closed as long as the engine fuel oil pressure is up to the required point. The other safety switches include a lubricating oil pressure switch 98, a transmission oil pressure switch 99, a water temperature switch 100, and an engine over-speed switch 101.

Switch 98 is closed until the lubricating oil pressure reaches a given point, say 15 pounds, then opens and remains open as long as the engine is running and the pressure is kept up. Likewise switch 99 is closed until the transmission oil pressure reaches a given point, then opens and remains open as long as the engine is running and the pressure is kept up. Switch 100 is open at all times unless the engine cooling water heats up unduly, say above 200° F., at which point it closes. Switch 101 closes only when the engine over-speeds but at all normal speeds is closed.

In running, after starting, all switches 98, 99, 100, 101 are open and 97 is closed. Consequently the closing of any one of the switches 98, 99, 100, 101 will energize the main latch relay coil LR and open switch LR–1 to cut out all the operating magnets Am, Bm, DRm, DFm and Em.

Energization of relay coil LR will also close the switch LR–3 in the circuit of a trigger relay coil LRT of the latch relay device. It also opens a switch LR–2 in its own circuit and is thereby de-energized. All the switches LR–1, LR–2, and LR–3 remain in the positions given them because the latch relay is a snap-action device.

When the trouble has been cleared the trigger relay coil LRT is energized by pressing the reset push-button 103. This snaps all switches LR-1, LR-2 and LR-3 back to their first positions.

The closure of the safety circuit, at any of switches 98, 99, 100, 101, also energizes an air valve relay coil AVR which closes a switch AVR-1 to energize an air valve magnet AVM and close the damper of the engine air intake to shut down the engine. The damper itself is not shown. Restoration of all of the safety switches 98, 99, 100, 101 to open position de-energizes relay AVR to open AVR-1 and de-energize magnet AVM to allow the air damper to be held open again.

If it is desired to shut the engine down manually this may be done by pushing either stop push botton SPB-1 at the operator's controls or by pushing another stop push button SPB-2 at the engine location. Closure of either SPB-1 or SPB-2 will energize fuel oil cut-off relay FVM to shut off the oil supply to the engine.

The operation of the engine starting means and the safety means should be clear from the above description in view of the fact that the general operations have already been described.

The Fig. 13 wiring system is very much like that of Fig. 12 and, as far as applicable, the same references and legends are used. One difference is that the governor switch G is placed in series with switch Es, this having already been mentioned. The latch relay LR (LR-1 etc.) is omitted and the fuel pressure switch 97 is also omitted, the safety switches 98, 99 being in circuit with isolation switch 84 and disconnect switch 86 and air valve magnet AVM and to ground through a damper switch 104 to operate a trigger, not shown, which allows the air damper to close and open switch 104 to cut off magnets A$m$, B$m$, DR$m$, DF$m$, E$m$ from ground. It is necessary to turn the air valve or damper by hand back to open position and latch it to close switch 104 and permit these magnets A$m$ etc. to function again. Valve magnet AVM is also in a parallel circuit through switches 100, 101 to ground so that the closure of either will energize AVM and open switch 104 to cut out the magnets A$m$ etc. Starting is assured because the switches 100, 101 which connect air valve trigger magnet AVM directly to ground through switch 104 are open at starting and the switches 98, 99 which are closed at starting are in a circuit through the isolation switch 84 which is open to switches 98, 99 at starting and closed to the starting button 94 until the engine comes up to speed. By the time switch 84 is put back in circuit with safety switches 98, 99 they have opened by increased oil pressure created by pumps operated by the engine and magnet AVM is not energized. Thereafter, during running however, it will be energized whenever any of the safety switches 98, 99, 100, 101 closes.

It has thus seen that the invention provides simple and convenient means for controlling the operation of a vehicle by a prime-mover such as a diesel engine operating through a torque converter. A single lever controls main clutch engagement and engine throttle and is so related to a reverse lever that neither can be operated when the other is out of a given position, "neutral" position for the reverse lever and an off declutched position for the control lever. Also the control lever is so confined and constrained, as by its guide slot, that it is required to cause certain control actions before it can be moved to cause other specified control actions.

While one embodiment of the invention has been described by way of illustration it is to be understood that there may be various embodiments within the scope of the invention.

What is claimed is:

1. Control means for an engine driven torque converter installation having a main or reversing clutch mechanism to the final drive shaft and a lock-up clutch mechanism for the torque converter, comprising in combination, a first control element which actuates means which condition the reversing clutch mechanism for forward or reverse drive or neutral but without causing clutching in of the mechanism for driving, a second control element which regulates the power and speed of the engine, said second control element having movement from a lower end or zero, off, or idling position to higher positions at which clutching and higher speeds are produced, means associated with and controlled by the second control element when moved out of idling position and at all times thereafter for completing the connection of the main clutch for driving in the direction selected by the first control element, means associated with and controlled by the second control element when moved above the main clutch engaging position for operating a device which conditions said lock-up clutch for direct drive engagement, said second control element thereafter at all times while moving above the main clutch engaging position maintaining said device in condition for causing the engagement of the lock-up clutch, means associated with and operated by said second control element for causing an increase of power and speed of said engine when said second control element is moving upward above the lock-up position for the converter clutch, interlocking means between said first or reverse control element and said second or speed control element for preventing movement of the first control element out of forward or reverse position except when the second control element is in idling, off position, and for preventing movement of the second control element from the idling, off position except when the first control element is in forward or reverse position, and means for causing delayed action of said second control element when moving in either direction past the converter lock-up position.

2. Control means for an engine driven torque converter installation having a main or reversing clutch mechanism to the final drive shaft and a lock-up clutch mechanism for the torque converter, comprising in combination, a first control element which actuates means which condition the reversing clutch mechanism for forward or reverse drive or neutral but without causing clutching in of the mechanism for driving, a second control element which regulates the power and speed of the engine, guide means for said second control element providing movement thereof in a first plane and in a second plane generally parallel therewith and also providing lateral cross-over movement of the control element between plane positions at a point above the lower end or zero, off, or idling position in the guide means in the first said plane, means asscociated with and controlled by the second control element when moved out of idling position and at all times thereafter for completing the connection of the main clutch for driving in the direction selected by the first control element, means associated with and controlled by the second control element when moved laterally in the cross-over portion of the guide means from the first plane to the second plane for operating a device which conditions said lock-up clutch for direct drive engagement, said second control element thereafter at all times while moving in the second plane maintaining said device in condition for causing the engagement of the lock-up clutch, and means associated with and operated by said second control element for causing an increase of power and speed of said engine when said second control element is moving upward in the second plane above the cross-over portion of the guide means.

3. Control means for an engine driven torque converter installation having a main or reversing clutch mechanism to the final drive shaft and a lock-up clutch mechanism for the torque converter, comprising in combination, a first control element which actuates means which condition the reversing clutch mechanism for forward or reverse drive or neutral but without causing clutching in of the mechanism for driving, a second control element which regulates the power and speed of the engine, guide means for said second control element providing movement thereof in a first plane and in a second plane generally parallel therewith and also providing lateral cross-over movement of the control element between plane positions at a point above the lower end or zero, off, or idling position in the guide means in the first said plane, means associated with and controlled by the second control element when moved out of idling position and at all times thereafter for completing the connection of the main clutch for driving in the direction selected by the first control element, means associated with and controlled by the second control element when moved laterally in the cross-over portion of the guide means from the first plane to the second plane for operating a device which conditions said lock-up clutch for direct drive engagement, said second control element thereafter at all times while moving in the second plane maintaining said device in condition for causing the engagement of the lock-up clutch, and means associated with and operated by said second control element for causing an increase of power and speed of said engine when said second control element is moving upward in the second plane above the cross-over portion of the guide means, said guide means providing movement of the second control element in the first said plane above said cross-over, said second control element causing power increase while maintaining the main clutch engaged as it moves in the first plane above the cross-over, and also causing drive through the torque converter.

4. Control means for an engine driven torque converter installation having a main or reversing clutch mechanism to the final drive shaft and a lock-up clutch mechanism for the torque converter, comprising in combination, a first control element which actuates means which condition the reversing clutch mechanism for forward or reverse drive or neutral but without causing clutching in of the mechanism for driving, a second control element which regulates the power and speed of the engine, guide means for said second control element providing movement thereof in a first plane and in a second plane generally parallel therewith and also providing lateral cross-over movement of the control element between plane positions at a point above the lower end or zero, off, or idling position in the guide means in the first said plane, means associated with and controlled by the second control element when moved out of idling position and at all times thereafter for completing the connection of the main clutch for driving in the direction selected by the first control element, means associated with and controlled by the second control element when moved laterally in the cross-over portion of the guide means from the first plane to the second plane for operating a device which conditions said lock-up clutch for direct drive engagement, said second control element thereafter at all times while moving in the second plane maintaining said device in condition for causing the engagement of the lock-up clutch, and means associated with and operated by said second control element for causing an increase of power and speed of said engine when said second control element is moving upward in the second plane above the cross-over portion of the guide means, said guide means providing movement of the second control element in the first said plane above said cross-over, said second control element causing power increase while maintaining the main clutch engaged as it moves in the first plane above the cross-over, and speed-controlled means associated with the lock-up clutch for causing it to be engaged for direct drive past the torque converter when a predetermined speed is reached while said second control element is disposed in the first plane.

5. Control means for an engine driven torque converter installation having a main or reversing clutch mechanism to the final drive shaft and a lock-up clutch mechanism for the torque converter, comprising in combination, a first control element which actuates means which condition the reversing clutch mechanism for forward or reverse drive or neutral but without causing clutching in of the mechanism for driving, a second control element which regulates the power and speed of the engine, guide means for said second control element providing movement thereof in a first plane and in a second plane generally parallel therewith and also providing lateral cross-over movement of the control element between plane positions at a point above the lower end or zero, off, or idling position in the guide means in the first said plane, means associated with and controlled by the second control element when moved out of idling position and at all times thereafter for completing the connection of the main clutch for driving in the direction selected by the first control element, means associated with and controlled by the second control element when moved laterally in the cross-over portion of the guide means from the first plane to the second plane for operating a device which conditions said lock-up clutch for direct drive engagement, said second control element thereafter at all times while moving in the second plane maintaining said device in condition for causing the engagement of the lock-up clutch, means associated with and operated by said second control element for causing an increase of power and speed of said engine when said second control element is moving upward above the cross-over portion of the guide means, and speed-responsive means which operates a second device for conditioning said lock-up clutch for direct drive engagement.

6. Control means for an engine driven torque converter installation having a main or reversing clutch mechanism to the final drive shaft and a lock-up clutch mechanism for the torque converter, comprising in combination, a first control element which actuates means which condition the reversing clutch mechanism for forward or reverse drive or neutral but without causing clutching in of the mechanism for driving, a second control element which regulates the power and speed of the engine, guide means for said second control element providing movement thereof in a first plane and in a second plane generally parallel therewith and also providing lateral cross-over movement of the control element between plane positions at a point above the lower end or zero, off, or idling position in the guide means in the first said plane, means associated with and controlled by the second control element when moved out of idling position and at all times thereafter for completing the connection of the main clutch for driving in the direction selected by the first control element, means associated with and controlled by the second element when moved laterally in the cross-over portion of the guide means from the first plane to the second plane for operating a device which conditions said lock-up clutch for direct drive engagement, said second control element thereafter at all times while moving in the second plane maintaining said device in condition for causing the engagement of the lock-up clutch, means associated with and operated by said second control element for causing an increase of power and speed of said engine when said second control element is moving upward above the cross-over portion of the guide means, speed-responsive means which operates a second device which conditions said lock-up clutch for direct drive engagement, and further means associated with said second-control element when moving in the cross-over and with said speed-responsive operated device for causing lock up by either alone or by both acting together, with the speed-responsive device acting after the control element actuated device has set up a condition for operation of the lock-up clutch.

7. Control means for an engine driven torque converter installation having a main or reversing clutch mechanism to the final drive shaft and a lock-up clutch mechanism for the torque converter, comprising in combination, a first control element which actuates means which condition the reversing clutch mechanism for forward or reverse drive or neutral but without causing clutching in of the mechanism for driving, a second control element which regulates the power and speed of the engine, guide means for said second control element providing movement thereof in a first plane and in a second plane generally parallel therewith and also providing lateral cross-over movement of the control element between plane positions at a point above the lower end or zero, off, or idling position in the guide means in the first said plane, means associated with and controlled by the second control element when moved out of idling position and at all times thereafter for completing the connection of the main clutch for driving in the direction selected by the first control element, means associated with and controlled by the second control element when moved laterally in the cross-over portion of the guide means from the first plane to the second plane for operating a device which conditions said lock-up clutch for direct drive engagement, said second control element thereafter at all times while moving in the second plane maintaining said device in condition for causing the engagement of the lock-up clutch, means associated with and operated by said second control element for causing an increase of power and speed of said engine when said second control element is moving upward above the cross-over portion of the guide means, and interlocking means between said first control element and said second control element which holds said first control element against operation out of forward or reverse position when the second control element is out of its zero, off, idling, non-clutching position, and which holds said second control element against operation out of zero position when the first control element is in neutral position.

8. Control means for an engine-driven torque converter installation having a main or reversing drive clutch mechanism to the final drive shaft, a lock-up clutch mechanism for the torque converter, and electrical switch and relay mechanisms for operating said clutch mechanisms, said control means comprising a first or direction selecting control lever turnable about a shaft axis and having switch contacts for selecting forward or reverse drive by the main clutch mechanism and having a neutral position between its forward and reverse positions, a second or speed control lever mounted to turn about the same shaft axis as said first control lever, guide means for said speed control lever providing movement in a first plane and a second generally parallel plane transverse to the shaft axis with a cross-over between planes above the lower end of the lever movement in the first plane where the speed control lever is in a zero, off, idling, non-clutching position, switch means associated with said speed control lever in its turning movement about the shaft axis for causing engagement of the main clutch mechanism for driving in the direction selected by said direction control lever and maintaining the main clutch engaged in all positions of the speed control lever above the off or idling position, other switch means associated with said speed control lever in its turning movement about the shaft axis for causing speed increase in stages as the lever moves upward from the off or idling position, and further switch means associated with said speed control lever in the cross-over and in the second plane of said guide means for conditioning said lock-up clutch mechanism for engagement at all times while the speed control lever is in said second guide plane.

9. Control means for an engine-driven torque converter installation having a main or reversing drive clutch mechanism to the final drive shaft, a lock-up clutch mechanism for the torque converter, and electrical switch and relay mechanisms for operating said clutch mechanisms, said control means comprising a first or direction selecting control lever turnable about a shaft axis and having switch contacts for selecting forward or reverse drive by the main clutch mechanism and having a neutral position between its forward and reverse positions, a second or speed control lever mounted to turn about the same shaft axis as said first control lever, guide means for said speed control lever providing movement in a first plane and a second generally parallel plane transverse to the shaft axis with a cross-over between planes above the lower end of the lever movement in the first plane where the speed control lever is in a zero, off, idling, non-clutching position, switch means associated with said speed control lever in its turning movement about the shaft axis for causing engagement of the main clutch mechanism for driving in the direction selected by said direction control lever and maintaining the main clutch engaged in all positions of the speed control lever above the off or idling position, other switch means associated with said speed control lever in its turning movement about the shaft axis for causing speed increase in stages as the lever moves upward from the main clutch engaging position, and further switch means associated with said speed control lever in the cross-over and in the second plane of said guide means for conditioning said lock-up clutch mechanism for engagement at all times while the speed control lever is in said second guide plane, said speed control lever being provided with an arcuate plate in its plane of movement about the shaft axis for actuating said lock-up clutch switch means as the lever moves in said guide cross-over and maintaining said switch means in the actuated condition in which it is placed when the lever moves in the guide cross-over at all times while the lever is moving in the selected one of said guide planes.

10. Control means for an engine-driven torque converter installation having a main or reversing drive clutch mechanism to the final drive shaft, a lock-up clutch mechanism for the torque converter, and electrical switch and relay mechanisms for operating said clutch mechanisms, said control means comprising a first or direction selecting control lever turnable about a shaft axis and having switch contacts for selecting forward or reverse drive by the main clutch mechanism and having a neutral position between its forward and reverse positions, a second or speed control lever mounted to turn about the same shaft axis as said first control lever, guide means for said speed control lever providing movement in a first plane and a second generally parallel plane transverse to the shaft axis with a cross-over between planes above the lower end of the lever movement in the first plane where the speed control lever is in a zero, off, idling, non-clutching position, switch means associated with said speed control lever in its turning movement about the shaft axis for causing engagement of the main clutch mechanism for driving in the direction selected by said direction control lever and maintaining the main clutch engaged in all positions of the speed control lever above the idling position, other switch means associated with said speed control lever in its turning movement about the shaft axis for causing speed increase in stages as the lever moves upward from the main clutch engaging position, further switch means associated with said speed control lever in the cross-over and in the second plane of said guide means for conditioning said lock-up clutch mechanism for engagement at all times while the speed control lever is in said second guide plane, and interlocking means between said first control lever and said second control lever which holds said first control lever against operation out of forward or reverse position when the second control lever is out of its zero idling and non-clutching position, and which holds said second control lever against operation out of zero position when the first control lever is in neutral position.

WALTER B. DEAN.
DAVID L. BUCHANAN.

References Cited in the file of this patent

UNITED STATES PATENTS

| Number | Name | Date |
|---|---|---|
| 1,527,247 | Bouillon | Feb. 24, 1925 |
| 1,862,186 | Huddle | June 7, 1932 |
| 2,014,944 | Martyrer | Sept. 17, 1935 |
| 2,159,316 | Breer | May 23, 1939 |
| 2,252,042 | Sinclair | Aug. 12, 1941 |
| 2,332,593 | Nutt | Oct. 26, 1943 |
| 2,358,094 | Panish | Sept. 12, 1944 |
| 2,380,677 | Schjolin | July 31, 1945 |
| 2,386,391 | Fike | Oct. 9, 1945 |
| 2,395,180 | Good | Feb. 19, 1946 |
| 2,419,908 | Mott | Apr. 29, 1947 |
| 2,426,064 | Stevens | Aug. 19, 1947 |
| 2,452,599 | Paulus | Nov. 2, 1948 |
| 2,454,485 | Snell | Nov. 23, 1948 |
| 2,493,592 | Peabody | Jan. 3, 1950 |
| 2,512,853 | Eaton | June 27, 1950 |
| 2,519,080 | Simpson | Aug. 15, 1950 |
| 2,612,061 | Schjolin | Sept. 30, 1952 |